United States Patent [19]
Ogino

[11] Patent Number: 5,483,507
[45] Date of Patent: Jan. 9, 1996

[54] INFORMATION RECORDING AND/OR REPRODUCING METHOD AND APPARATUS INCLUDING HEAD SEEK DISTANCE AND DIRECTION CONTROL BASED ON ADDRESS INFORMATION

[75] Inventor: Tsukasa Ogino, Yokohama, Japan

[73] Assignee: Canon Kabushiki Kaisha, Tokyo, Japan

[21] Appl. No.: 180,386

[22] Filed: Jan. 12, 1994

[30] Foreign Application Priority Data

Jan. 14, 1993 [JP] Japan ................................ 5-020863

[51] Int. Cl.$^6$ ................................................. G11B 7/00
[52] U.S. Cl. ...................... 369/32; 369/44.78; 360/78.14
[58] Field of Search ........................... 369/44.28, 44.29, 369/32, 54, 41, 44.34, 78.04; 360/78.05–78.08, 78.14

[56] References Cited

U.S. PATENT DOCUMENTS

| | | | |
|---|---|---|---|
| 4,835,752 | 5/1989 | Nakatsu et al. | 369/41 X |
| 5,048,001 | 9/1991 | Moriya et al. | 369/44.28 X |
| 5,063,549 | 11/1991 | Yamamuro | 369/44.28 |

FOREIGN PATENT DOCUMENTS

| | | |
|---|---|---|
| 0443042 | 8/1991 | European Pat. Off. . |
| WO9102351 | 2/1991 | WIPO . |

OTHER PUBLICATIONS

Patent Abstracts of Japan, Kokai No. 02–246056, vol. 14, No. 574, Oct. 1990.
Patent Abstracts of Japan, Kokai No. 56–003468, vol. 5, No. 48, Jan. 1981.

*Primary Examiner*—Aristotelis Psitos
*Assistant Examiner*—Thang V. Tran
*Attorney, Agent, or Firm*—Fitzpatrick, Cella, Harper & Scinto

[57] ABSTRACT

In an information recording/reproducing apparatus, a recording/reproducing head is moved across tracks on a recording medium by a linear motor which is controlled to effect a seek operation of the head to a target track. A CPU for controlling the apparatus judges the seek direction of the head and whether the seek distance of the head is equal to or greater than a predetermined distance, in conformity with a recording or reproduction command from a host controller on the basis of a logical address designated by the host controller and a logical address at which the head is positioned. When the seek distance is equal to or greater than the predetermined distance, the linear motor is activated in the seek direction. Then, the logical address designated by the host controller is converted into a physical address and a control is effected such that the head reaches the target track.

17 Claims, 5 Drawing Sheets

INFORMATION RECORDING AND/OR REPRODUCING METHOD AND APPARATUS INCLUDING HEAD SEEK DISTANCE AND DIRECTION CONTROL BASED ON ADDRESS INFORMATION

BACKGROUND OF THE INVENTION

1. Field of the Invention

This invention relates to an information recording-reproducing apparatus for recording and/or reproducing information on/from a recording medium such as a magnetic disc or a magneto-optical disc.

2. Related Background Art

Generally, in an information recording-reproducing apparatus such as a magnetic disc apparatus or an optical disc apparatus, when an information recording or reproduction command is received from an external controller, a process of analyzing the command is carried out and thereafter, a process for conversion from a logical address into a physical address is carried out. This conversion process includes a process for converting an address substituting the defective sector of a recording medium, and a process for converting a logical address into a physical address when the recording medium is divided into a plurality of zones and sectors constituting tracks differing from one another. When a track address for reading/writing information is thus found, seek control for moving a recording-reproducing head to a desired track is effected.

To make the recording-reproducing head seek to a desired position, it is necessary to control the velocity of the head efficiently and move the head rapidly and accurately. Generally, as a velocity control system for such a recording-reproducing head, there is adopted a control system of determining a predetermined movement schedule (velocity profile), detecting the velocity of the head in the course of seek and applying feedback so as to maintain the movement schedule. FIGS. 1A and 1B of the accompanying drawings show a popular control system, and in FIG. 1A, $V_{ref}$ is a reference velocity representative of the movement schedule velocity, and $V_n$ is a velocity detected in the course of seek. Also, here is shown in FIGS. 1A and 1B the relation between the velocity profile and the applied current to a carriage driving rough actuator (linear motor) for moving the head. The reference velocity $V_{ref}$ is a velocity calculated in conformity with the remaining distance to a target, and is found from the following equation:

$$V_{ref} = [2 \cdot \alpha (S - \lambda/2 \cdot N)]^{1/2}, \qquad (1)$$

where S is the movement distance to the target, $\lambda$ is the track pitch, $\alpha$ is the deceleration acceleration, and N is the zero cross count value from which the movement distance can be known. To control the velocity of the head, a command value to the linear motor is calculated from the target velocity $V_{ref}$ and then the current velocity $V_n$ at each predetermined cycle, whereby feedback is applied so that the velocity of the head may follow the target velocity. The command value $A_{ct}$ to the linear motor is calculated from the following equation, where K is the feedback gain.

$$A_{ct} = K(V_{ref} - V_n) \qquad (2)$$

Thus, as shown in FIG. 1B, the linear motor is supplied with an acceleration current at first and the velocity of the head is accelerated, and when the target velocity is reached, the current of the linear motor turns to a deceleration current, whereafter the head decelerates following the target velocity. When the head arrives at the target position, the velocity becomes 0 and thus, the seek operation is terminated.

When the velocity of the recording-reproducing head is to be detected, the detecting system is used properly in the high velocity region and the low velocity region of the velocity. Specifically, first in the high velocity region, there is used a track counting system for detecting the velocity from the number N of tracks the head has crossed within a predetermined sampling interval $T_s$. The velocity by this track counting system is detected from the following equation:

$$V_n = (\lambda/2 \cdot N)/T_s \qquad (3)$$

On the other hand, in the low velocity region, there is used an inter-track counting system for detecting the zero cross points of a tracking error signal and detecting the velocity from the time $T_d$ between the zero cross points. That is, the distance between the zero cross points is ½ of the track pitch $\lambda$ and therefore, if the passage time of this ½ pitch is known, the velocity could be detected. The velocity $V_n$ at this time can be found from the following equation:

$$V_n = (\lambda/2)T_d \qquad (4)$$

Such two velocity detecting systems are selected in conformity with a predetermined reference velocity, and are changed over in such a manner that when the velocity of the head is higher than the reference velocity value, the track counting system corresponding to the high velocity region is selected and when the velocity of the head becomes lower than the reference velocity value, the inter-track counting system corresponding to the low velocity region is selected.

FIG. 2 of the accompanying drawings shows the seek sequence from after the recording-reproducing head receives a command for the access to a desired position until it arrives at the desired position. When the head receives the command, address calculation such as converting the logical address into the physical address is effected, whereafter the linear motor is driven and seek control is effected. When the linear motor is driven, a delay time (rising time) $T_M$ is created by the coil and static friction or the like of the linear motor, and the seek operation is started after this delay time $T_M$. Thus, in the prior art, when the access of the recording-reproducing head to the desired position is to be effected, a system overhead time like the time $T_S$ required for the address calculation and the delay time $T_M$ of the linear motor have been required, besides the actual seek time, and this has been a factor which increases the whole access time.

SUMMARY OF THE INVENTION

The present invention has been made in view of such circumstances and the object thereof is to provide an information recording-reproducing apparatus in which address calculation is effected within the delay time of a linear motor, whereby the system overhead time can be shortened to thereby make rapid access possible.

The above object of the present invention is achieved by an information recording-reproducing apparatus having moving means for moving a recording-reproducing head transversely of the tracks of an information recording medium, and control means for controlling this moving means to thereby make the recording-reproducing head seek to a desired track, characterized in what when a recording or reproduction command is received from a host controller, the seek direction of the recording-reproducing head and whether the seek distance of the head is equal to or greater than a predetermined distance are judged from a logical address designated by said host controller and a logical address at which the recording-reproducing head is now positioned, and when the result of this judgment is equal to or greater than the predetermined distance, said moving means is activated in said seek direction, whereafter the logical address designated by said host controller is converted into a physical address and the desired track is calculated.

DESCRIPTION OF THE PREFERRED EMBODIMENT

Figure 1A:
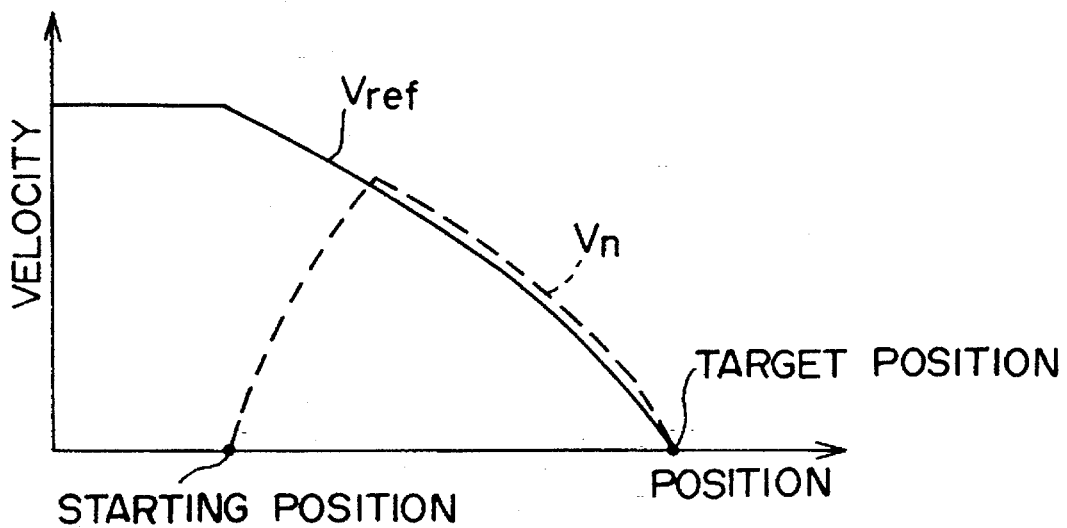
FIGS. 1A and 1B are graphs for illustrating the velocity controlling operation of a recording-reproducing head according to the prior art.
Figure 1B:
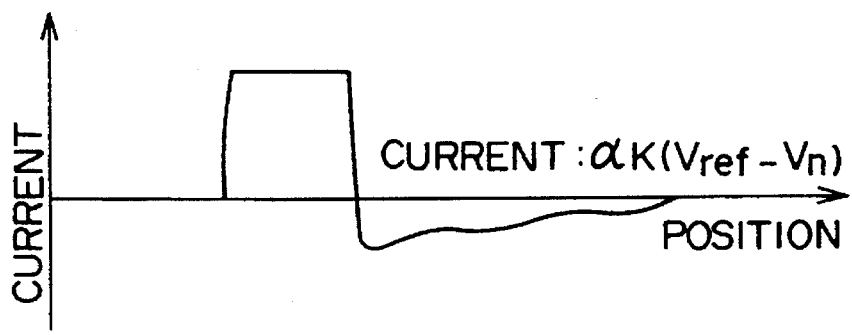
Figure 2:
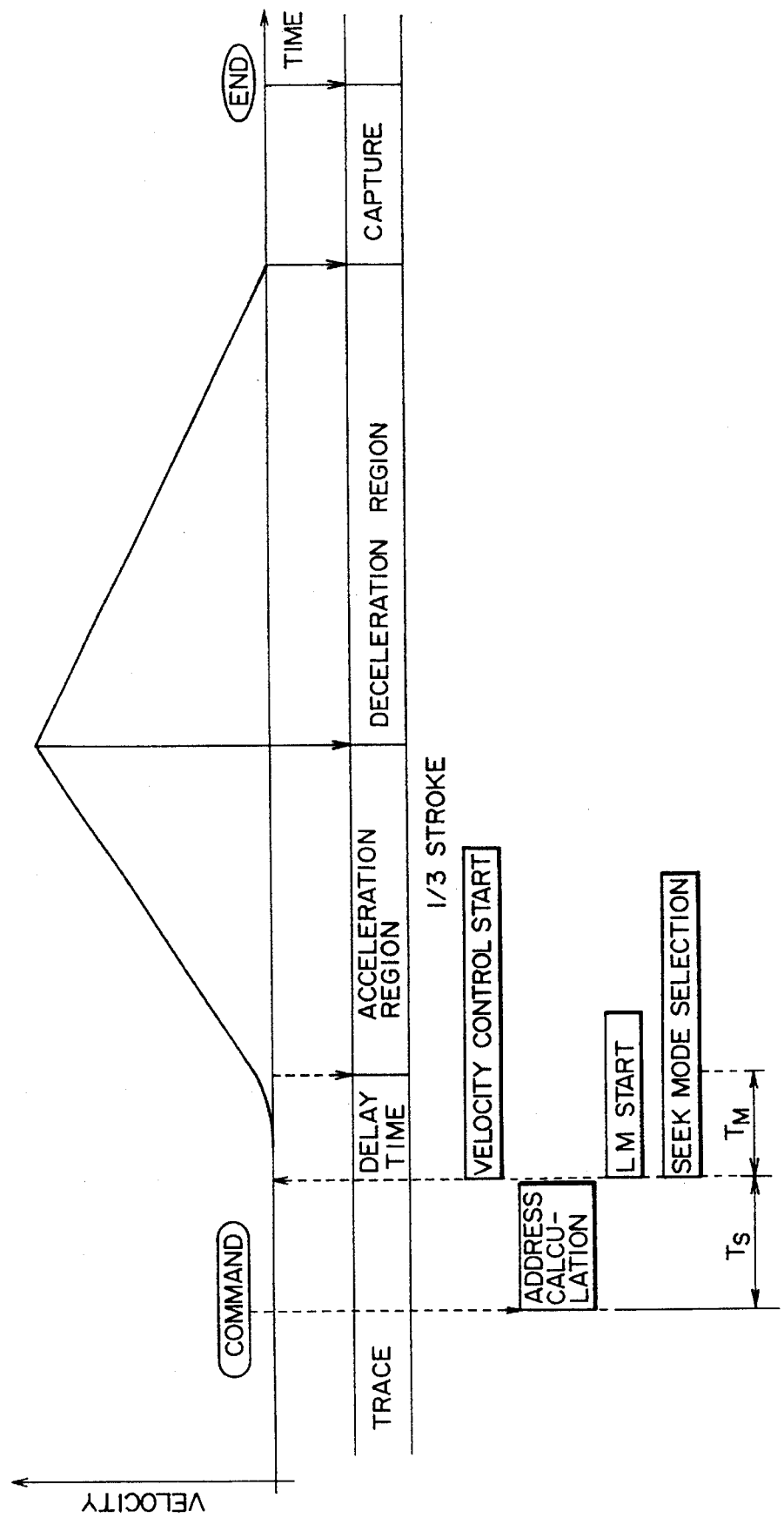
FIG. 2 shows the seek sequence during the access of the recording-reproducing head according to the prior art.
Figure 3:
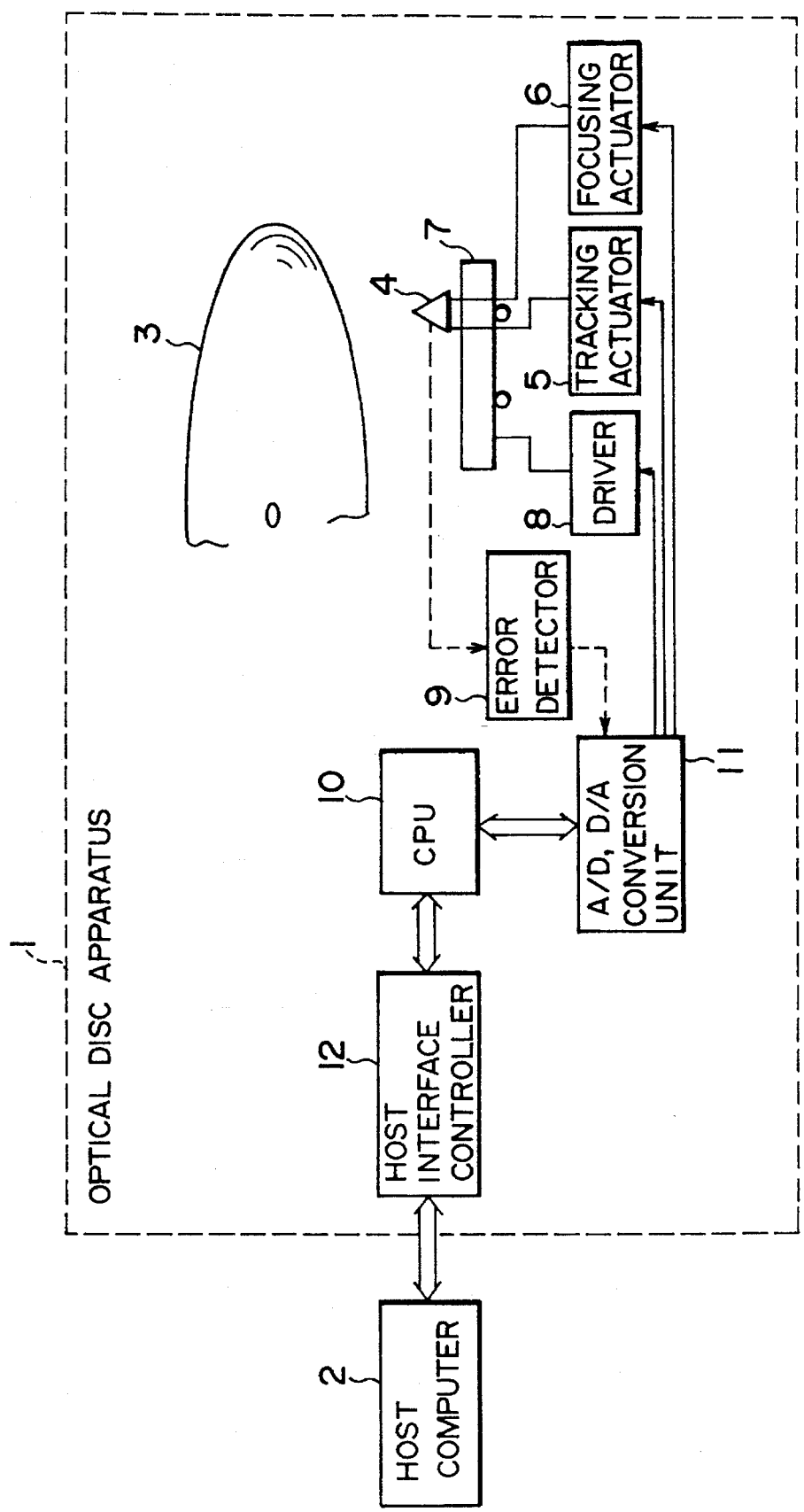
FIG. 3 is a block diagram showing an embodiment of the information recording-reproducing apparatus of the present invention.

An embodiment of the present invention will hereinafter be described in detail with reference to the drawings. FIG. 3 is a block diagram showing an embodiment of the information recording-reproducing apparatus of the present invention. Herein, description will be made with an optical disc apparatus taken as an example of the information recording-reproducing apparatus. In FIG. 3, reference numeral 1 designates an optical disc apparatus for effecting the recording and/or reproduction of information on/from an information recording medium. The optical disc apparatus 1 is connected as an external memory apparatus to a host computer 2. The host computer 2 issues various commands to the optical disc apparatus 1, in which recording and reproduction are executed on the basis of the commands. The construction of the optical disc apparatus 1 is as follows.

Reference numeral 3 denotes an optical disc which is an information recording medium and is rotated at a constant velocity by the driving of a drive system, not shown. Reference numeral 4 designates an optical system for optically recording information on the optical disc 3 or reproducing the recorded information on the optical disc 3. The optical system 4 is comprised of various optical elements such as a semiconductor laser which is a light source for recording and reproduction, an objective lens for converging a laser beam from the semiconductor laser into a minute light spot and applying it onto the optical disc 3, and a sensor for detecting the reflected light from the optical disc 3. Reference numeral 5 denotes a tracking actuator for moving the objective lens in the optical system 4 radially of the optical disc 3, and reference numeral 6 designates a focusing actuator for moving the objective lens in a direction perpendicular to the plane of the optical disc 3. These two actuators 5 and 6 and the optical system 4 are unitized as an optical head and designed to be movable radially of the optical disc 3. Reference numeral 7 denotes a linear motor for moving the optical head radially of the optical disc 3 and making it seek to a desired position, and reference numeral 8 designates a driver for driving the linear motor 7.

Reference numeral 9 denotes an error detector for detecting a tracking error signal and a focusing error signal on the basis of the output of the sensor in the optical system 4. The error signals obtained in the error detector 9 are sent to a CPU 10, by which the tracking actuator 5 and the focus actuator 6 are controlled on the basis of the error signals to thereby effect tracking control and focusing control. The CPU 10 is a digital control circuit for controlling the entire apparatus, and executes, besides the aforementioned tracking control and focusing control, the analysis of the commands sent from the host computer 2, address calculation, seek control, the control of information recording, the control of information reproduction, etc. Reference numeral 11 designates an A/D and D/A conversion unit for converting command values designated by the CPU 10 into analog signals and outputting them to the tracking actuator 5, the focusing actuator 6 and the driver 8, or converting the error signals detected by the error detector 9 into digital signals and outputting them to the CPU 10. Reference numeral 12 denotes a host interface controller provided between the host computer 2 and the CPU 10.

Figure 4:
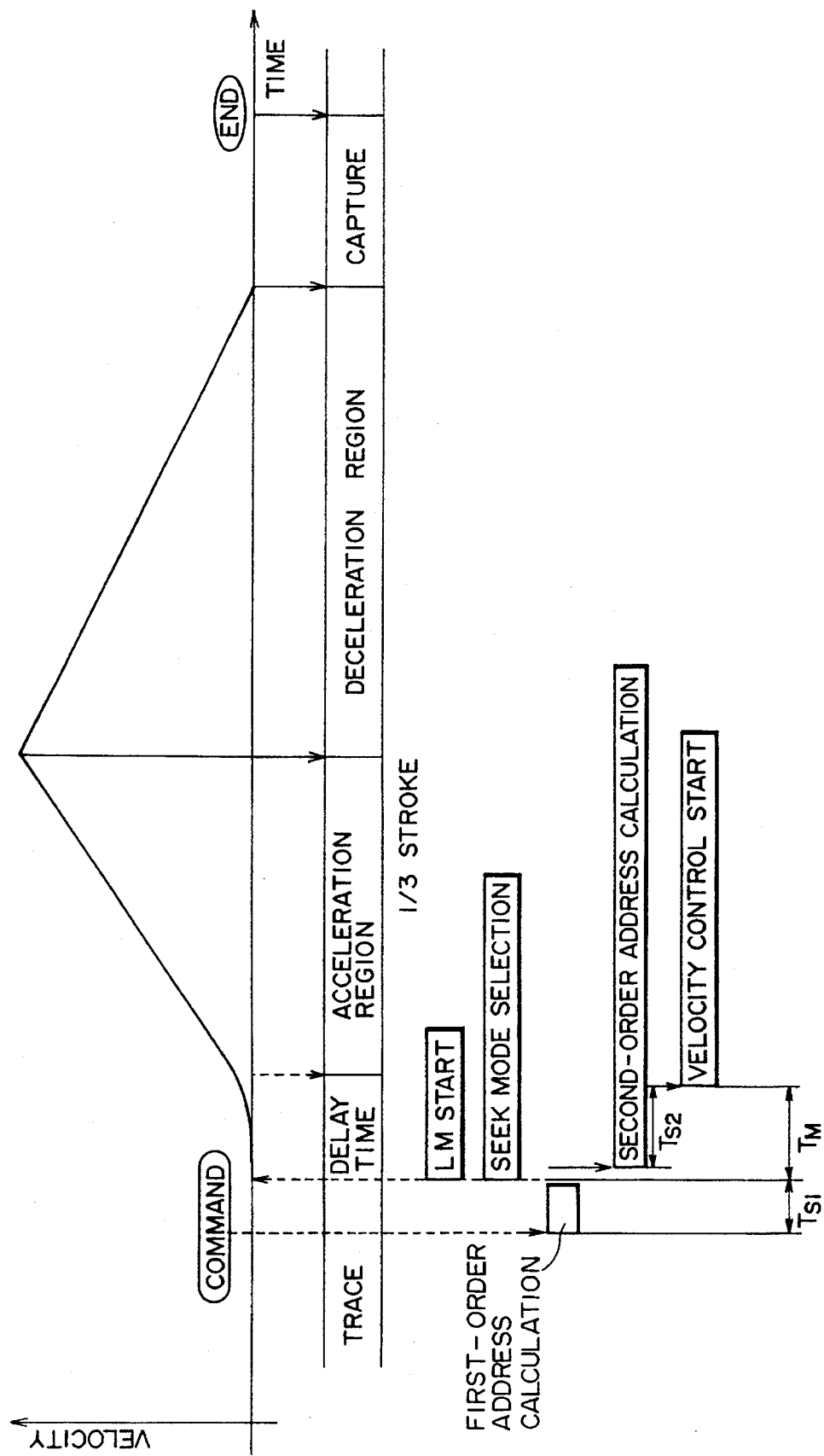
FIG. 4 shows the access sequence of the embodiment of FIG. 3.
Figure 5:
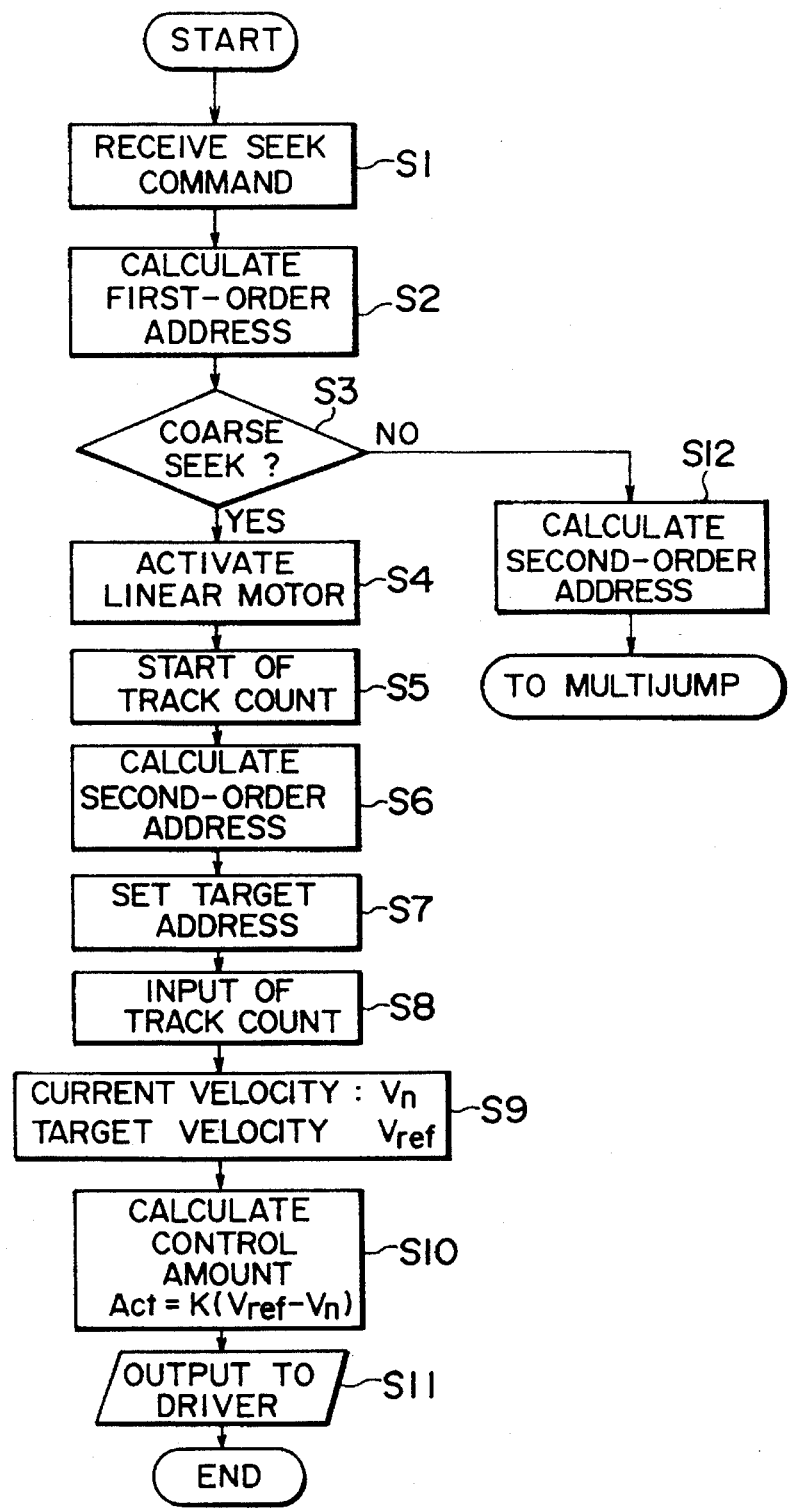
FIG. 5 is a flow chart showing the controlling operation during the seek operation of the embodiment of FIG. 3.

The operation of the present embodiment will now be described with reference to FIGS. 4 and 5. FIG. 4 shows the access sequence when the optical head is accessed to a desired position, and FIG. 5 is a flow chart showing the controlling operation of the CPU 10 during the access. When information is to be recorded (or reproduced), a recording command is issued from the host computer 2, which is a host controller, to the optical disc apparatus 1. This command is received by the CPU 10 through the host interface controller 12 (S1). The command is analyzed in the CPU 10, and if as a result of the analysis, it is judged that a seek operation is necessary, first-order address calculation is effected (S2). The first-order address calculation is effected in the following manner. First, the logical address of the optical disc 3 in which the optical head is now positioned is compared with a desired logical address designated by the host computer 2, and whether the seek direction is the inner periphery side or the outer periphery side is discriminated. Also, as a result of the comparison between the logical addresses, whether the difference therebetween is greater than a predetermined value is examined, whereby whether the seek is coarse seek is judged (S3).

If the difference between the logical addresses is greater than the predetermined value, the coarse seek in which the linear motor 7 is driven to move the optical head is selected, and if the difference between the logical addresses is smaller than the predetermined value, multijump in which a beam of light is made to jump by the minute movement of the objective lens by the tracking actuator 5 is selected. That is, if the desired address is at a position far from the current position, it is judged that the seek operation by the linear motor 7 is necessary, and if the desired address is at a position whereat the number of tracks to the desired position is approximate to e.g. several tens to several hundreds, it is judged that the seek operation by the linear motor 7 is unnecessary and the jump by the tracking actuator 5 will suffice. Thus, the seek direction and the seek mode are judged on the basis of the result of the first-order address calculation (S3), and if it is judged that the seek mode is the coarse seek by the linear motor 7, the CPU 10 activates the linear motor 7 (S4) and also, track count is started and seek control is started (S5).

When seek control is started, the CPU 10 executes second-order address calculation for converting the original logical address designated by the host computer 2 into a physical address (S6), and sets a target address (target track) by the result thereof (S7). When the target address is determined, the CPU 10 starts the velocity control of the optical head as previously described. The sequence after a command is received is shown in FIG. 4, and when the command is received, first-order address calculation is first effected and from the result thereof, the seek mode is selected, and when the seek mode is judged to be the coarse seek by the linear motor, the linear motor (LM) is activated. Second-order address is then calculated, and when the target address is determined, velocity control is started.

The seek velocity controlling operation has been previously described in detail and therefore will be described briefly here. The track count value of a counter, not shown, is first input to the CPU 10 (S8). When the beam of light crosses the information tracks, one period of the tracking error signal corresponds to one track and therefore, the number of tracks the beam of light has crossed can be known by counting the tracking error signal. The CPU 10 then calculates a reference velocity Vref on the basis of the track count value, and also calculates the current velocity Vn by the aforedescribed track counting system or the inter-track counting system (S9). The reference velocity is calculated from the aforementioned equation (1), and the current velocity is calculated from equation (3) or (4). The CPU 10 calculates the control amount of the linear motor 7 on the basis of the target velocity and current velocity thus obtained (S10), and outputs it to the driver 8 (S11). Thus, the linear motor 7 is driven with a designated control amount, and feedback is applied thereto so that the linear motor may follow the target velocity. The control amount is calculated from the aforementioned equation (2).

The series of processes of steps S8–S11 in the above-described velocity control are carried out in each predetermined period and as a result, as shown in FIG. 4, the optical head seeks in accordance with a predetermined velocity profile. That is, at first, the optical head is accelerated toward the target velocity, and when it reaches the target velocity, it is decelerated following the target velocity. When the optical head arrives at a desired track, the beam of light is finally drawn onto the desired track and a series of data transferred from the host computer 2 are recorded. On the other hand, if at S3, the seek mode is judged to be multijump, the CPU 10 effects second-order address calculation similar to that of S6 (S12), and starts the control of the multijump toward the desired address obtained. That is, the jump operation of the beam of light by the tracking actuator 5 is performed and the beam of light is drawn onto the desired track. When the beam of light is thus drawn onto the desired track, a series of data transferred from the host computer 2 are likewise recorded. Of course, when a reproduction command is received from the host computer 2, the information of the desired track is reproduced and the reproduced data are transferred to the host computer 2 by the control of the CPU 10.

As described above, in the present embodiment, when a recording or reproduction command is received, the seek direction and whether the seek distance is equal to or greater than a predetermined distance are judged at first and whether the seek mode is the seek by the linear motor or the seek by multijump is determined, and if the seek mode is the seek by the linear motor, the linear motor is activated, whereafter the logical address designated by the host computer is converted into a physical address and a desired track is found, whereby address calculation can be effected within the delay time (rising time) of the linear motor and the access time can be correspondingly shortened. That is, when as shown in FIG. 4, the time from after the command is received until the first-order address calculation for judging the seek direction and the seek mode is $T_{S1}$ and the calculation time of a second-order address during which the logical address is converted into a physical address and a desired track is calculated in $T_{S2}$ and the delay time of the linear motor $T_M$, first-order and second-order address calculations have heretofore been effected before the activation of the linear motor, while in the present embodiment, second-order address calculation is effected within the delay time of the linear motor. Therefore, it becomes possible to shorten the access time by an amount substantially corresponding to the second-order address calculation time $T_{S2}$.

The term "logical address" used herein refers to an address logically indicative of the arrangement of data, and the term "physical address" refers to a physical address on the medium. These are well-known terms.

The present invention is not restricted to the above-described embodiment, but of course, various constructions are possible without departing from the gist of the invention.

For example, in the embodiment, description has been made with an optical disc apparatus taken as an example of the information recording-reproducing apparatus, whereas the present invention is not restricted thereto, but is also applicable to a magnetic disc apparatus and the like.

The present invention is also applicable to an apparatus in which control is effected with the physical address at the beginning or in which recording or reproduction is effected without the logical address being converted into the physical address.

In that case, when for example, a target address is given, this target address is compared with the current address, and the seek direction and whether the seek distance is equal to or greater than a predetermined distance are judged, and if the seek distance is equal to or greater than the predetermined distance, seek is started. Thereafter, a predetermined process such as calculating the accurate position of the target address on the recording medium or calculating the velocity profile of the head can be carried out.

As described above, the present invention has the effect that address calculation for converting the logical address into the physical address is effected within the rising time during the activation of the moving means, whereby the system overhead time can be shortened by an amount corresponding to the address calculation and the access time of the apparatus can be speeded up.

What is claimed is:

1. An information recording and/or reproducing apparatus having moving means for moving a recording and/or reproducing head transversely of the tracks of an information recording medium, and control means for controlling said moving means to thereby cause the head to seek to a desired track, said apparatus comprising:

determining means for determining a seek direction of the head and whether a seek distance of the head is equal to or greater than a predetermined distance, on the basis of a logical address designated by a host controller and a logical address at which the head is positioned, in conformity with a recording or reproduction command from the host controller;

means for instructing said control means to activate said moving means in the seek direction when said determining means determines that the seek distance of the head is equal to or greater than the predetermined distance; and means for converting the logical address designated by the host controller into a physical address and for calculating the desired track after said instructing means has given instructions to said control means to activate said moving means.

2. The information recording and/or reproducing apparatus of claim 1, further comprising second instructing means for giving instructions to said control means so that the head reaches the desired track calculated by said calculating means.

3. An information recording and/or reproducing apparatus comprising:

an optical head comprising a semiconductor laser, an objective lens for directing a light beam from said laser to an information recording medium, a sensor for detecting light reflected from the information recording medium, and a tracking actuator and a focusing actuator for moving said objective lens;

a linear motor for moving said optical head in a direction intersecting a track of the information recording medium;

a driver for driving said linear motor; and a CPU for controlling said information recording and/or reproducing apparatus, wherein said CPU executes the following steps (1) through (4) in order:

(1) said CPU determines a seek direction of said head and whether a seek distance of said head is equal to or greater than a predetermined distance on the basis of a logical address designated by a host controller and a logical address at which said optical head is positioned in conformity with a recording or reproduction command from the host controller, (2) when it is determined that the seek distance of the head is equal to or greater than the predetermined distance, said CPU instructs said driver to activate said linear motor in the seek direction, (3) said CPU converts the logical address designated by said host controller into a physical address and calculates a target track after said driver has activated said linear motor, and (4) said CPU controls said driver so that said optical head arrives at the target track.

4. A method of recording and/or reproducing information by controlling moving means for moving a recording and/or reproducing head so as to control head seek, said method comprising the steps of:

determining seek direction of the head and whether a seek distance of the head is equal to or greater than a predetermined distance, on the basis of an address designated by a host controller and an address at which the head is positioned, in conformity with a recording or reproduction command from the host controller;

activating the moving means in the seek direction when it is determined in said determining step that the seek distance of the head is equal to or greater than the predetermined distance;

executing a predetermined processing for causing the head to reach the designated address after activation of the moving means; and controlling the moving means on the basis of the result of the predetermined processing so that the head reaches the designated address.

5. A method of recording and/or reproducing information by controlling moving means for moving a recording and/or reproducing head in a direction intersecting a track of an information recording medium, to cause the head to seek to a desired track, said method comprising the steps of:

determining a seek direction of the head and whether a seek distance of the head is equal to or greater than a predetermined distance on the basis of a logical address designated by a host controller and a logical address at which the head is positioned in conformity with a recording or reproducing command from the host controller;

activating the moving means in the seek direction when it is determined in said determining step that the seek distance of the head is equal to or greater than the predetermined distance;

converting the logical address designated by the host controller into a physical address and calculating the target track after effecting said activating step; and controlling the moving means so that the head reaches the target track.

6. A method of recording and/or reproducing information by controlling moving means for moving a recording and/or reproducing head in a direction intersecting a track of an information recording medium to cause the head to seek to a target track, said method comprising the steps of:

executing a primary address calculation by comparing a logical address designated by a host controller with a logical address at which the head is positioned and determining whether a seek distance of the head is equal to or greater than a predetermined distance;

activating the moving means when it is determined in said determining step that the seek distance of the head is equal to or greater than the predetermined distance; and executing a secondary address calculation for converting the logical address designated by the host controller into a physical address and setting the target track from a result of the secondary address calculation after effecting said activating step.

7. A method according to claim 6, further comprising controlling the moving means so as to cause the head to reach the target track.

8. A method according to claim 6, wherein the moving means is a linear motor.

9. A method of recording and/or reproducing information by controlling moving mans for moving a recording and/or reproducing head in a direction intersecting a track of an information recording medium to cause the head to seek to a target track, said method comprising the steps of:

executing a primary address calculation by comparing a logical address designated by a host controller with a logical address at which the head is positioned and determining whether a seek distance of the head is equal to or greater than a predetermined distance;

activating the moving means when it is determined in said determining step that the seek distance of the head is equal to or greater than the predetermined distance; and in a rise-time upon activation of the moving means, executing a secondary address calculation for converting the logical address designated by the host controller into a physical address and setting the target track from a result of the secondary address calculation.

10. A method according to claim 9, further comprising controlling the moving means so as to cause the head to reach the target track.

11. A method according to claim 9, wherein the moving means is a linear motor.

12. A recording and/or reproducing method for use with a device including first moving means for moving a recording and/or reproducing head in a direction intersecting a track of an information recording medium and second moving means for moving an objective lens provided in the head in the track intersecting direction, the first moving means being controlled to seek the head to a target position to thereby effect at least one of recording of information and reproduction of information, said method comprising the steps of:

executing a primary address calculation by comparing a logical address designated by a host controller with a logical address at which the head is positioned and determining whether a seek distance of the head is equal to or greater than a predetermined distance;

activating the second moving means when it is determined in said determining step that the seek distance of the head is less than the predetermined distance;

activating the first moving means when it is determined in said determining step that the seek distance of the head is equal to or greater than the predetermined distance; and after effecting activation of the first moving means, executing a secondary address calculation for converting the logical address designated by the host controller into a physical address and setting the target position from a result of the secondary address calculation.

13. A method according to claim 12, further comprising controlling the first moving means to cause the head to reach the target position.

14. A method according to claim 12, wherein the first moving means is a linear motor and the second moving means is a tracking actuator.

15. A recording and/or reproducing method for use with a device including first moving means for moving a recording and/or reproducing head in a direction intersecting a track of an information recording medium and second moving means for moving an objective lens provided in the head in the track intersecting direction, the first moving means being controlled so as to cause the head to seek to a target position to thereby effect at least one of recording of information and reproduction of information, said method comprising the steps of:

comparing a logical address designated by a host controller with a logical address at which the head is positioned;

determining, on the basis of a result of said comparing step, which one of the first moving means and the second moving means is activated; and in the case of determining that the first moving is activated, after effecting activation of the first moving means, converting the logical address designated by the host controller into a physical address and setting the target position.

16. A method according to claim 15, further comprising controlling the first moving means so as to cause the head to reach the target position.

17. A method according to claim 15, wherein the first moving means is a linear motor and the second moving means is a tracking actuator.

* * * * *